July 28, 1931.  Y. NAGANO  1,816,192

NUT LOCK

Filed Feb. 17, 1930

INVENTOR:
YASUHIKO NAGANO.
BY ATTY:
Edward M. Kofins

Patented July 28, 1931

1,816,192

UNITED STATES PATENT OFFICE

YASUHIKO NAGANO, OF LOS ANGELES, CALIFORNIA

NUT LOCK

Application filed February 17, 1930. Serial No. 429,103.

This invention relates to improvements in nut locks, and its objects are to provide an efficient device of this character which will positively prevent a nut, when drawn firmly in position, from loosening upon the bolt.

The objects are to prevent loosening of nuts, and to provide means whereby the nuts may be clamped and retained in position.

To accomplish these objects, I provide a washer adapted to be positioned beneath the nut, and a plurality of projections extending from the periphery of the washer, and adapted to engage with the threads of the bolt, and another projection adapted to engage with any face or corner of the nut to prevent the same from turning.

Figure 1:
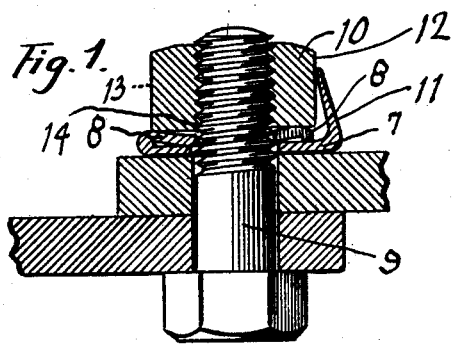
Figure 2:
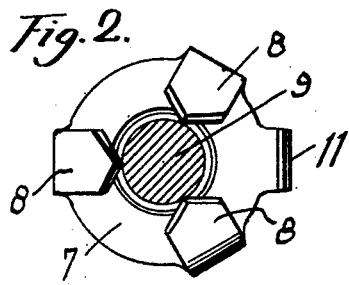
Figure 3:
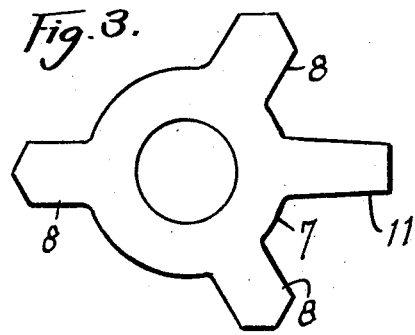
Figure 4:
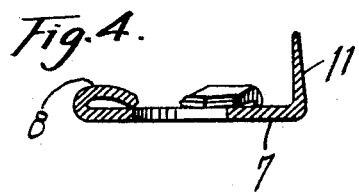
Figure 5:
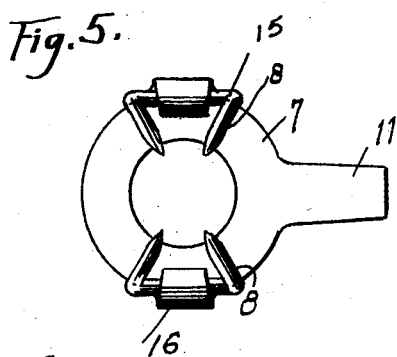
Figure 6:
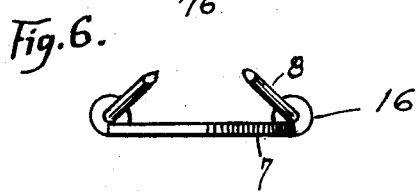

In the drawings, Figure 1 is a sectional elevation of a nut and bolt provided with my improved locking device, the bolt being shown in elevation. Fig. 2 is a top plan view of the locking device, and shows the bolt in section. Fig. 3 is a plan of the blank from which the device is made, showing the form thereof before bending the projections thereon. Fig. 4 is a sectional elevation of the locking device. Fig. 5 is a top plan of a modified form of the device. Fig. 6 is a side elevation of the modified form.

Referring in detail to the drawings, my improved locking device consists of a washer 7, having projections 8 adapted to engage with the threads of a bolt 9, when pressed by a nut 10 thereon, and having a lug 11, adapted to engage with a face 12, or corner 13, of the nut. The bolt threads 14 will be slightly upset by projections 8, thereby preventing the turning or loosening of the bolt, and the lug 11, after the nut is tight, is to be hammered and driven against the face of the nut.

In the modified form shown in Figs. 5 and 6, projections 8 are on movable pawls 15, mounted in knuckles 16, integral with the washer 7.

In use, the nut is first tightened and turned firmly in position. This flattens the projections and forces them into engagement with the threads of the bolt. The lug is then driven against the nut, thereby preventing the nut from turning. The projections further slightly upset the threads at the bottom of the nut, thereby preventing the nut from loosening. To remove the nut, the lug is driven away and out of engagement with the nut, and the nut may then be turned off. The edges of the projections further engage with the bottom of the nut to prevent the turning thereof. Through engagement with the threads of the bolt, the washer will not turn while the nut is being tightened.

From the foregoing description and drawings, it may be seen that I have provided an efficient nut lock, capable of firmly holding a nut from turning and loosening.

What is claimed is:

1. A nut lock, comprising a washer to be positioned beneath a nut, knuckle members on the periphery of the washer, pawls movably mounted in the knuckle members, engaging with the threads of the bolt, and a lug integral with the washer to be driven in engagement with the nut at any facet or corner thereof.

2. A nut lock, comprising a washer, knuckle members on the periphery of and integral with the washer, and sharp-pointed pawls operatively mounted in the knuckle members, and engaging with the threads on opposed sides of the bolt.

3. A nut lock, comprising a washer positioned beneath a nut, knuckle members integral with and on the periphery of the washer, sharp-pointed pawls operatively mounted in the knuckle members, and adapted to engage with the bolt threads on opposed sides of the bolt, and a lug integral with the washer to engage with the periphery of the nut.

YASUHIKO NAGANO.